March 17, 1931.   S. L. MADORSKY   1,796,871
METHOD OF REDUCTION AND REDUCING FURNACES
Filed March 3, 1928    2 Sheets-Sheet 1
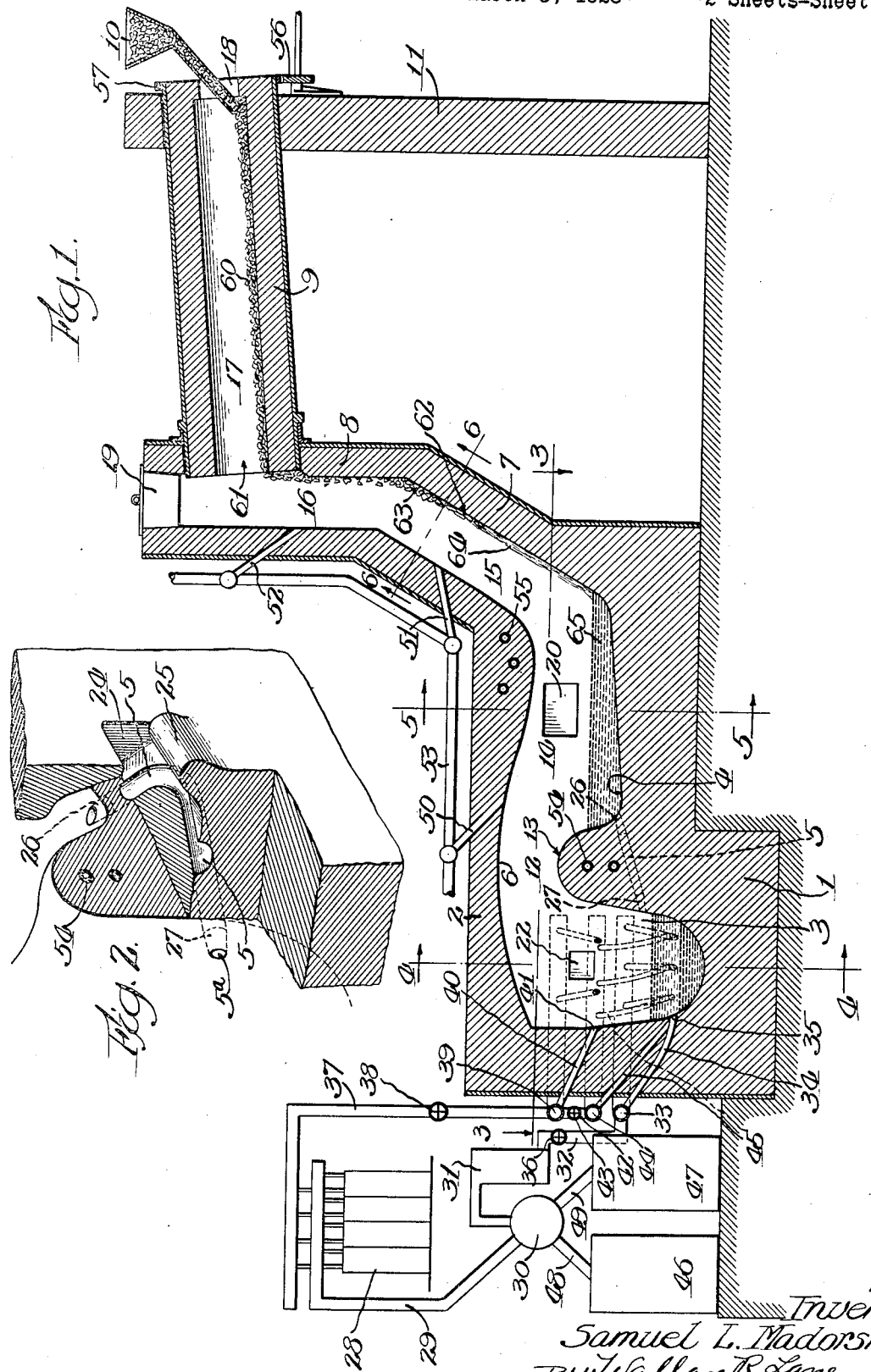
Inventor
Samuel L. Madorsky
By: Wallace R. Lane
Atty.

March 17, 1931. S. L. MADORSKY 1,796,871
METHOD OF REDUCTION AND REDUCING FURNACES
Filed March 3, 1928  2 Sheets-Sheet 2
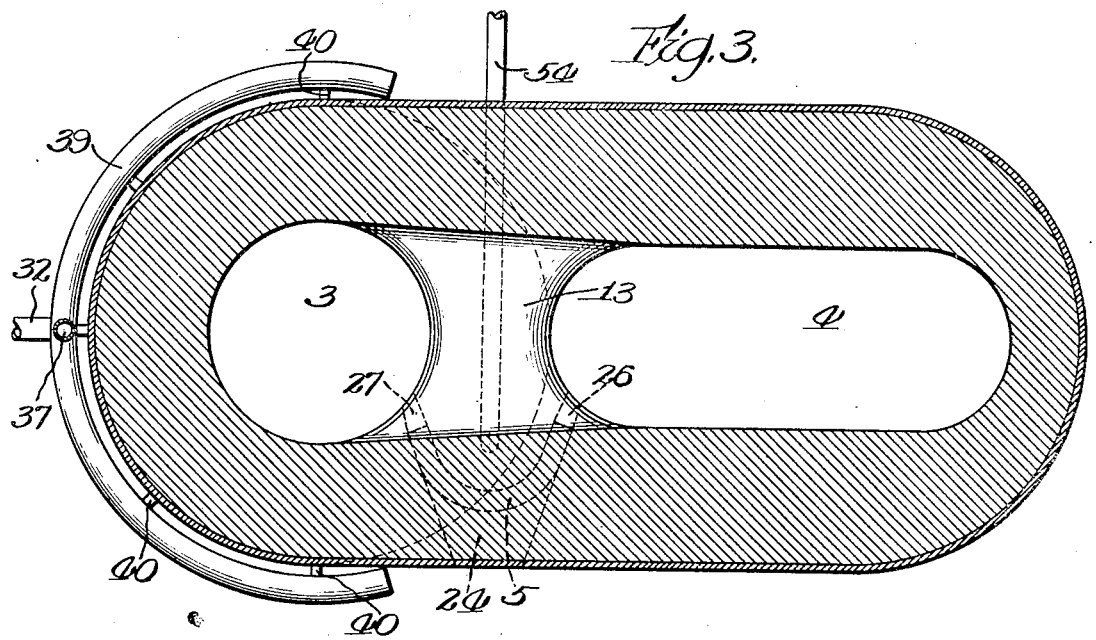
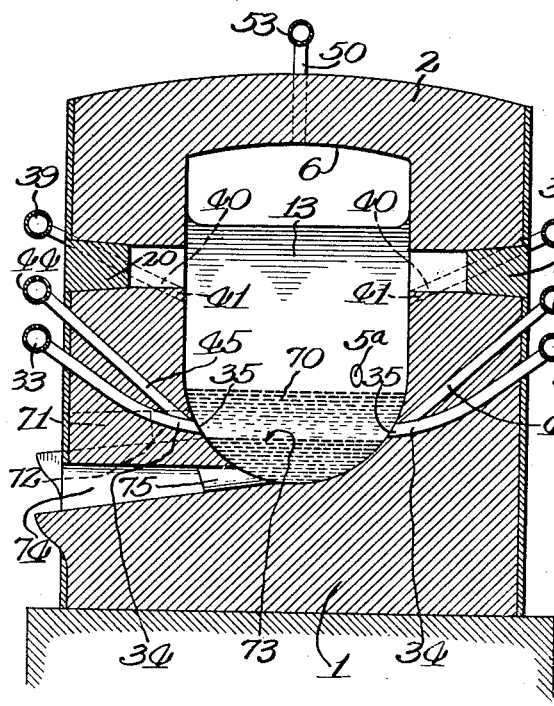
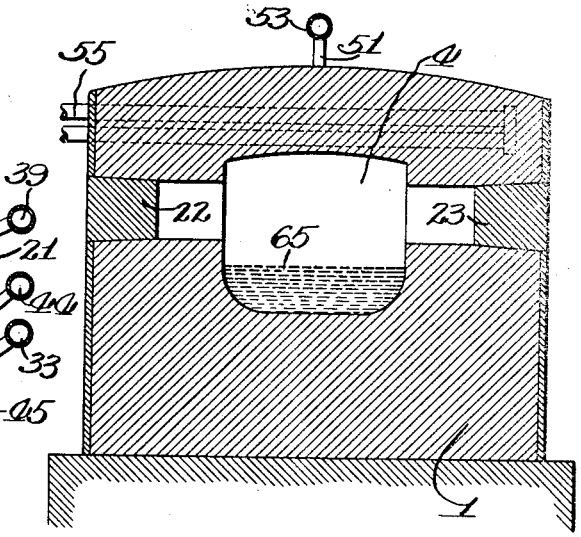
Inventor:
Samuel L. Madorsky
By: Wallace R. Lane
Atty.

Patented Mar. 17, 1931

1,796,871

UNITED STATES PATENT OFFICE

SAMUEL L. MADORSKY, OF CHICAGO, ILLINOIS, ASSIGNOR TO GATHMYS RESEARCH CORPORATION, OF CHICAGO, ILLINOIS, A CORPORATION OF ILLINOIS

METHOD OF REDUCTION AND REDUCING FURNACES

Application filed March 3, 1928. Serial No. 258,820.

The present invention relates to the process of reducing metals, such as iron, directly from its ores, such as the oxide ores of the metal, and furnaces therefor.

Among the objects of the invention is to provide a novel process for the direct reduction of the metal from the ores, such as iron from the oxide ores thereof, in an efficient and practical manner and to the end of obtaining a substantially pure metal, as pure iron, and also a novel furnace adapted to carry out such process.

In illustration of the invention, the process is performed on the ores of iron, such as magnetite, $Fe_3O_4$, and other like and similar ores, preferably with the use of a reducing gas or gaseous reducing agent, such as hydrogen, carbon monoxide, blue gas, carburetted water-gas, coke-oven gas, producer gas, and other like and similar gases and agents. In carrying out my novel process, the reducing gas or gaseous reducing agent or medium or a mixture thereof, is passed through a bath or batch of molten metal ore, such as molten iron oxide ore in my novel furnace.

When molten iron oxide ore, such as magnetite, $Fe_3O_4$, is reduced with a reducing gas, such as hydrogen or carbon monoxide, the reduction takes place in two stages, the ferric oxide is first reduced to a lower oxide such as ferrous oxide, FeO, and after the ferric oxide has been thus reduced to ferrous oxide, then the latter will be reduced by the gas to iron. The reactions are as follows:

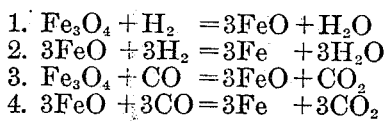

1. $Fe_3O_4 + H_2 = 3FeO + H_2O$
2. $3FeO + 3H_2 = 3Fe + 3H_2O$
3. $Fe_3O_4 + CO = 3FeO + CO_2$
4. $3FeO + 3CO = 3Fe + 3CO_2$

In the first three reactions, heat is absorbed, and hence the reaction is endothermic, and in the fourth reaction, heat is liberated, and hence the reaction is exothermic. Thus where hydrogen is the reducing agent, heat is required for both stages of reduction, but where blue-gas is the reducing agent, that part of it which is carbon monoxide is reacting with the iron oxide will require heat in the first stage but will evolve heat in the second stage of the reduction. Since blue-gas contains about 50% hydrogen, 30-35% carbon-monoxide and about 8% carbon dioxide, the carbon monoxide in it will be effective to only a small extent, in the presence of the 8% carbon dioxide, due to the severe equilibrium requirements for carbon monoxide at the temperature of molten iron oxide ore. Thus, even when the blue-gas or similar gas is used, hydrogen will be the principal reducing agent. The reaction, whether in the case of hydrogen, blue-gas or other reducing gas, will require heat from the outside of the reaction mass itself.

The heat requirements are severe, since hydrogen or blue-gas is preferably introduced into the molten ore at about 800 to 1000° C., which is below the temperature of the molten ore, whereby heat is required to be added. The heat requirements are for (1) the first stage of reduction, (2) the second stage of reduction, (3) heating reducing gas from about 800–1000° C. to about 1600° C., (4) heating and melting the ore and fluxes, and (5) radiation losses.

In the present invention the different stages of reduction are effected serially in different but co-related parts of a novel furnace. In the one part, the ore is reduced to ferrous oxide preparatory to being reduced to iron in the other part of the furnace, while at the same time in the other part of the furnace the ferrous oxide is reduced to iron while a preparatory quantity of ore is being reduced to ferrous oxide in the first mentioned part of the furnace. The furnace is preferably constructed for readily transferring or conducting the pre-reduced or prepared ore from a hearth therefor, to another hearth for the final reducing reaction. In both stages of reduction the ore is in molten condition. The heating and reduction of the molten ore is more rapid, efficient and practicable than in the case with solid or non-fused ore, or even with partly fused ore.

Another advantage gained from the separate yet cooperating stages of reduction is the saving in time. In previous methods, when both stages of reduction occurred in the same hearth, the molten ore would first be reduced to ferrous oxide, and only after all of it had been reduced to the lower oxide, would the ferrous oxide then be reduced. In the present invention, the different stages of reduction are reacting co-temporaneously or simultaneously such that in a preceding stage there is a reaction preparatory for the reaction in a succeeding stage. In other words, one batch of ore is being pre-reduced and melted while at the same time another batch is being reduced in the final stage to iron.

Another object of this invention is the provision of means for and the use of the waste gas or gases from the final reducing stage to partly reduce and to fuse or maintain fused the ore in the first stage. This is preferably effected by passing the excess of reducing gas rising from the molten ore in the final reducing stage, with waste gas and burning the same over the molten ore in the first stage. Gas poor in hydrogen or carbon monoxide will however, effect the necessary reduction of $Fe_2O_3$ or $Fe_3O_4$ to FeO in this first stage. A richer gas is required for reduction of FeO to Fe, which is effected in the final reducing stage.

A further object of the invention is to effect heating of the ore or ore portions successively and in a direction opposite to the succession of steps or stages of operation or reactions of the ore portions in the furnace. This is preferably effected by burning a part of the free or excess reducing gas in the waste gas at several points of the furnace, such as (a) in the reducer where the final reduction occurs, over the surface of the molten charge, (b) in the melter or pre-reducing hearth, over the surface of the molten ore therein, and (c) in the passage leading to the melter and from the pre-heating kiln or the like, where the ore drops to an inclined surface and is partly or wholly fused and partly reduced. This method of heating by steps has the advantage of introducing the heat where it is needed and of preventing over-heating of the furnace lining at any place. To aid in the burning, means for supplying a supporter of combustion, such as oxygen, air, or a mixture of both, or the like is preferably used whereby the combustion over the reducer will supply the necessary heat and convert the reduced but nonfused iron to a molten state for drawing it off, and the continued burning of the gases as they flow from the reducer to the melter may supply both from the continued combustion and the sensible heat in the gases, heat for the fusing or maintaining in fused condition of the ore in the pre-reducing or melting hearth, and further the continued burning and flow of gases to the conducting means or passage for the ore moving toward the melter, to fuse or partly fuse the ore as well as partly reduce the same. The reducing power of the gases is preferably regulated to be spent when the gases reach the discharge of the pre-heater or kiln for the ore, such that only the sensible heat in the products of combustion is utilized to preheat the ore, it being preferable that the temperature of the gases be not above 1,000° C. as they enter the kiln. To control this, the furnace has, at various points along the passage of the gases, tuyères for the admission of air or the like to effect the desired drop in excess temperature that might arise, as also to complete burning of any excess gas, such as hydrogen, carbon-monoxide and the like before such gas could reach the kiln, it being preferable that all reduction reaction be effected before the gases arrive at the pre-heater or kiln.

Another object of the invention is to provide for a process that is continuous in all its phases and a novel furnace where such continuous process may be effected. All the advantages appertaining to the blast furnace, the open hearth and the Bessemer converter are secured and utilized here in a single unitary furnace and in a continuous and serial stage process.

Other objects, advantages, capabilities, features and process steps are comprehended by the invention as will later appear and are inherently possessed by the invention.

Referring to the drawings, Fig. 1 is a longitudinal vertical sectional view through a furnace constructed in accordance with the invention; Fig. 2 is a fragmentary view in perspective with parts shown in broken section, of a part of the furnace; Fig. 3 is a horizontal sectional view taken in a plane represented by line 3—3 in Fig. 1 of the drawings; Fig. 4 is a transverse sectional view taken in a plane represented by line 4—4 in Fig. 1 of the drawings; Fig. 5 is a transverse sectional view taken in a plane represented by line 5—5 in Fig. 1 of the drawings; and Fig. 6 is a sectional view taken in a plane represented by line 6—6 in Fig. 1 of the drawings.

Referring now more in detail to the drawings, the embodiment selected to illustrate the invention is shown with a base portion 1, and a roof portion 2, between which are located a reducing hearth 3, and a melting or pre-reducing hearth 4, the latter being located at a higher level than the former, and having communication to it by way of a passage or gutter 5, as clearly shown in Figs. 1, 2 and 3, of the drawings. The roof has a ceiling 6 curving downwardly over the hearth 4 for reverberating the hot gases over such hearth. At one end of the hearth 4, the furnace has an upwardly inclined portion 7 leading to an upright portion 8. Connected with the upper end of the portion 8, and laterally therewith is rotary kiln 9 with which is associated a hopper 10, the kiln 9 being inclined and rotary and supported at its upper end by a suitable supporting means or wall 11, as shown.

From over the hearth 3 leads a passage 12 over a bank wall 13, such passage 12 leading into the passage portion 14 over the hearth 4, and thence through an inclined passage 15 in the inclined portion 7 of the furnace and thence to a vertical passage 16 in the furnace portion 8. The passage 16 leads into interior or passage 17 of the rotary kiln 9, the passage 17 having an opening 18 at the upper end of the kiln for the exit of waste gases. The upper end of the passage portion 16, may be suitably closed by a plug or the like 19, which, when it is desired to use a bar in the passage 16, may be removed for such purpose.

The side walls of the furnace may be provided with suitable openings normally closed by doors 20, 21, 22 and 23, these doors being of utility for giving access into the hearths as also permitting a viewing of the contents therein as desired.

The means for conducting or transferring material from the melting hearth 4 to the reducing hearth 3, is shown more clearly in Fig. 2, such means showing a passage or gutter 5 leading from a low point of the hearth 4 and passing through a side chamber 24 open at the side of the furnace, and thence to outlet 5ª in the reducing hearth. See Fig. 4. A bank wall 25 may be provided in the opening at the side of the furnace to guard against any of the material passing to the outside of the furnace. The opening at the side of the furnace is divergent and extends toward the ends of the gutter 5, so as to facilitate the entry of a bar or the like for the insertion of plugs 26 and 27, as well as for removing such plugs, when it is desired to cause a flow of molten material from the upper to the lower hearth. The ends of the gutter passage 5 may be tapered for the plugs to be properly held therein. From Fig. 3 it will be noted that the gutter passage is curved or substantially U-shaped, but this form of gutter may be as desired.

At the end of the furnace containing the reducing hearth 3, are located means for producing reducing gases and also gases for aiding in the combustion of excess reducing gases in the furnace. Any suitable means for producing the gases may be used, and for illustration, there is shown in Fig. 1, in a conventional manner, an electrolysis plant 28 for the production of hydrogen and oxygen. This type of plant is especially useful in localities where hydro-electric plants furnish electric currents cheaply. From this plant leads a duct 29 to a control valve 30 and thence to a scrubber or cleaner 31 from which the hydrogen gas may pass through a duct 32 to a main 33 connected with a plurality of tuyères 34 passing through the wall of the furnace and having outlets 35 into the lower part of the hearth 3, but at a given distance above the bottom thereof. The duct 32 may be controlled by a suitable valve 36. From the plant 28 also leads a duct 37 having a valve 38 and leading to a main 39 and connected to a plurality of tuyères 40 having outlets 41 into the upper part of the hearth 3. This duct is adapted to convey oxygen for supplying a supporter of combustion in the space above the hearth 3 for a purpose later described. If air be used in place of oxygen, the air may be supplied from any suitable point and connected to the duct 37 for transfer of the same through the tuyères 40. In some cases it might be desired to deliver the oxygen or air at the same points or substantially at the same points as where the hydrogen or other reducing gas is delivered in the hearth 3. Hence, a duct 42 having a valve 43, is connected to the main 39 and leads to a main 44 having a plurality of tuyères 45 having the discharge outlets thereof discharging into the outlets 35 of the tuyères 34. When other reducing gas is used instead of hydrogen, such as blue-gas, carbon monoxide, etc., as previously mentioned, the same may be produced or generated in suitable gas producers 46 and 47 having ducts 48 and 49 leading to the control valve 30. The latter may be operated to either pass hydrogen to the mains or the gas produced by the producers 46 and 47.

At suitable points in the furnace are provided inlet tuyères 50, 51 and 52 connected to a duct 53 adapted to supply air, oxygen or the like from any suitable source. The tuyères 50, 51 and 52 are located to respectively deliver air or the like into the passages 14, 15 and 16 as clearly shown in the drawings.

For the purpose of protecting parts of the furnace against the heat, water cooling pipes 54, and 55 may be inserted in the furnace material, such as shown in Figs. 1, 3 and 5. It will also be noted that the cross section of the passage 15 is wider than the depth as clearly shown in Fig. 6, so as to offer a wide surface over which the material moves when the furnace is being operated.

It will be noted from the construction disclosed, that it has features and advantages of a blast furnace, an open hearth, and a converter such as that known as the Bessemer converter.

In the operation of the device, reducing gas is supplied through the tuyères 34 into the hearth 3. The ore, which, for the purpose of illustration, may be oxide of iron, is supplied with suitable flux material, in the hopper 10 from which the ore will pass into the passage 17 of the rotary kiln 9. This kiln may be suitably rotated by a gear 56 in mesh with a ring gear 57 connected to an end of the kiln. The kiln is suitably rotated in bearings in the wall 11 and the upright part 8 of the furnace, as clearly shown. The ore 60 in the kiln will be tumbled about and caused to slide through the passage 17 and then be discharged through the outlet 61 of the kiln, so as to fall through the passage 16 which is here termed the "drop" of the furnace. While the ore 60 is passing through the kiln passage 17, hot gases are passing upwardly through this passage for supplying heat to the ore so as to pre-heat the same. The sensible heat or temperature of these gases is not such as to in any way fuse or melt the ore. It is preferable that the temperature of the hot gas entering at the outlet 61 of the passage 17 should be maintained below 1000° C.

As the preheated ore falls through the passage 16, it will come in contact with the inclined surface 62 of the passage 15, this part of the furnace being termed the "slide" of the furnace. At this point, the gases have a higher temperature and also have included therein a certain amount of reducing gases. That part of the ore 63 on the slide 62 effected by these gases will begin to be fused so that it will be in a more or less thick viscous condition, and to a certain extent there will be a small amount of reduction by whatever reducing gases are present in the waste gases passing up through the passage 15. Farther down the slide, the ore 64 becomes more fused and can readily flow down the remaining part of the slide into the inlet end of the hearth 4. At this part of the slide, where the ore is substantially fused so that it may flow as a liquid, the gases passing through the passage 15 are at greater temperature and also have a greater amount of reducing gas constituents, and a small amount of reducing will take place in the molten or substantially fused material, thus sliding down, or rather flowing down the remainder of the slide.

The fused ore will thus flow into and accumulate in the hearth 4 to form a bath or batch 65. This hearth is preferably shallow, and elongated as well as narrow, and is deeper at its discharge end as clearly shown in Fig. 1. The hot gases proceeding from the hearth 3 and passing through the passage portions 12 and 14, will be reverberated over the surface of the melted or fused ore in the hearth 4 and give up some of its heat to maintain the batch 65 in molten state as well as also subjecting the surface of this bath to the contact of the reducing gas present in the waste gases passing over the hearth. The reaction in this bath is to change the higher oxide to the lower oxide of iron or like metal. When this is completed, then the batch may be transferred to the hearth 3, by way of the gutter 5 described above.

For the purpose of transferring the charge or batch 65, the workman inserts a bar through the side opening 24 of the furnace and into the upper end of the passage or gutter 5, so as to remove the plug 26, and he likewise removes the plug 27 by inserting the bar through the lower part of the gutter. The molten ore will then freely flow into the lower hearth 3. It will assume a level substantially that shown in Fig. 1 of the drawings. It will, of course, be understood that the ore includes a suitable flux so that a slag will be formed with impurities from the molten ore.

When the batch has been transferred, the workman may then insert plugs 26 and 27 back in place, or new plugs may be inserted so as to close the passage from the upper to the lower hearth, and to permit accumulation of another charge of molten ore in the upper hearth.

In the reducing hearth, while the charge is being flowed thereinto, reducing gas is passed through the tuyères 34 into the hearth and charge, so that the gas will pass upwardly through the upper part of the charge, since the outlets of the tuyères are intermediate the bottom and top of such charge. In this way, the molten ore is reduced from its lower oxide to metal, and as fast as the metal is formed, it will sink to the bottom of the hearth and the molten ore previously there will rise to the upper part of the charge. This will continue until all of the molten ore is converted into metal. There will, of course, be a certain amount of slag on the surface of this charge. Inasmuch as the reducing reaction in the hearth 3 is endothermic, when the hydrogen is the principal reducing agent, and inasmuch as the reducing gas is introduced at a lower temperature than that of the ore in this hearth, the ore or slag will solidify whatever may be the reducing gas, unless heat is added thereto. For this purpose the air or oxygen is directed through the series of tuyères 40. This air or oxygen combines with part of the reducing gas in the waste gas above the molten charge in hearth 3, thus producing heat required to keep the charge in molten state during the process of reduction. In this way the heat will be applied from the top. The ore or slag being agitated by the reducing gas, will absorb the heat efficiently and distribute it through the mass, thus keeping it in molten state. The iron, however, falling to the bottom, will not be agitated and will therefore chill and remain in semi-fused or solid spongy state.

As soon as the molten ore is entirely converted into this metal, the slag 70 may be withdrawn through a discharge passage 71 by suitable removal of the plug 72. Inasmuch as slag is an insulator of heat to a greater or less extent, it is necessary to remove this slag. After such removal of the slag, the plug 72 its replaced to close the passage 71. It will be noted that the furnace is designed in proportion such that the outlets 35 of the tuyères will be located just above the level of the unfused or solid metal, the upper level of this being designated by the reference character 73 in Fig. 4 of the drawings. Continued supply of reducing gas such as hydrogen or the like, is effected through the tuyères, just over the surface of the iron, and now oxygen, air on the like is continued to be supplied through the tuyères 40, so that the hydrogen mixing with the oxygen will burn to produce heat for melting the non-fused or solid iron in the bottom of the hearth 3. When the oxygen or air is supplied through the tuyères 40, the combustion of the gases will occur more or less high in the hearth space, but if it be desired to apply the heat at a lower point, instead of running the oxygen or air through the tuyères 40, the same may be run through the tuyères 45 so that they will mix with the hydrogen or similar gas immediately above the surface 73 of the iron. In this way the iron will receive greater heat and will melt more readily. However, the oxygen or air may be supplied through the two sets of tuyères 40 and 45 as desired.

The products of combustion will pass through the passage 12 into the passage 14 and give off sensible heat to the charge on the hearth 4. There will also be a certain amount of unburned reducing gas which will be present in the waste gases to effect the reduction on the melting hearth 4, as above described.

When the metal has been fused, it may then be withdrawn through the passage 74 by a suitable withdrawing of the plug 75, as clearly shown in Fig. 4 of the drawings. When this is accomplished, the plug 75 is then replaced. In the case when oxygen, air or the like is introduced through the tuyères 45, then the oxidizing gas is switched over to the tuyères 40. While the reducing gas, such as the hydrogen is being continued through the tuyères 34 and into the hearth 3, the charge from the upper hearth may be then transferred to the lower hearth.

Inasmuch as the action is normally a heat absorbing reaction, the amount of reducing gas is supplied in excess of that required for a complete reaction, whereby the excess reducing gas passing upwardly from the charge in the hearth 3 is partly burned with oxygen, air or the like. The remaining reducing gas will pass with the waste gases into the passages 12, 14, and 15. The greater amount of the excess reducing gas will react upon the charge in the upper hearth to pre-reduce the molten ore therein. Part of the reducing gas at this point will burn with oxygen, air or the like, above the ore in this upper hearth, and a small portion of the same remaining in the waste gases will then act upon the partly fused or substantially fused ore 64 to further partly reduce the same as well as giving up some of its heat toward the fusing action. A further amount of reducing gas may act on the ore 63 to also effect a small amount of reducing. By the time the waste gases reach the drop or passage 16, practically all of the reducing gas constituents have been utilized and only the waste gases having sensible heat will enter the outlet 61 of the passage 17 of the kiln. Should, for any reason, the gases rise in temperature greater than that desired at the outlet 61, the same may be controlled by the passing of air or the like into the passage portions 14, 15 and 16 by way of the tuyères 50, 51 and 52. The passing of air will have the effect of cooling the temperature of the waste gases so as to prevent a too great temperature in kiln. On the other hand, should there be a greater amount of excess reducing gas than can be absorbed or used before the waste gases reach the outlet 61, and should the gases not have enough heat to raise the temperature of the ore in the rotary kiln to the desired temperature, the introduction of air or oxygen or other supporters of combustion at these points will aid in furnishing the required amount of heat.

While I have herein described and upon the drawings shown an illustrative embodiment of the invention, and have also disclosed a method or process of reducing ores, it is to be understood that the invention is not limited thereto, but may comprehend other constructions, arrangements of parts, details, features and process steps without departing from the spirit thereof.

Having thus disclosed the invention, I claim:

1. A method of obtaining metal from its oxide ore, comprising passing a reducing gas through molten ore in a part of a furnace, and passing the waste gas passing off from said ore over molten ore in another part of said furnace to partly reduce the latter ore.

2. A method of obtaining metal from its oxide ore, comprising passing a reducing gas through molten ore in a part of a furnace, passing the waste gas passing off from said ore over molten ore in another part of said furnace to partly reduce the latter ore, and transferring the latter ore from said another part of said furnace to said part of said furnace for completion of reduction of said transferred ore.

3. A method of obtaining metal from its oxide ore, comprising passing a reducing gas through molten ore in a part of a furnace, passing the waste gas passing off from said ore over molten ore in another part of said furnace to partly reduce the latter ore, and passing the waste gas to a further part of the furnace to partly reduce and partly fuse ore moving toward said another part of said furnace.

4. A method of obtaining metal from its oxide ore, comprising passing a reducing gas through a quantity of molten ore, burning part of the excess reducing gas in the waste gas, and passing the remaining excess reducing gas with the waste gas over another quantity of molten ore.

5. A method of obtaining metal from its oxide ore, comprising passing a reducing gas through a quantity of molten ore, burning a part of the excess reducing gas in the waste gas, passing the remaining excess reducing gas with the waste gas over another quantity of molten ore, removing the metal of the first mentioned quantity of molten ore, and transferring the second mentioned quantity of ore to the locus of the first for the passing of the reducing gas therethrough.

6. A method of obtaining metal from its oxide ore, comprising passing a reducing gas through a quantity of molten ore, burning part of the excess reducing gas in the waste gas, passing the remaining excess reducing gas with the waste gas over another quantity of molten ore, to partly reduce the same while it is in molten state, and supplying partly reduced and partly fused ore to said another quantity of molten ore.

7. A method of obtaining metal from its oxide ore, comprising passing a reducing gas through a quantity of molten ore, burning part of the excess reducing gas in the waste gas, passing the remaining excess reducing gas with the waste gas over another quantity of molten ore to partly reduce the same while it is in molten state, burning part of the excess reducing gas in the waste gas over said another quantity of molten ore, and passing the remaining excess reducing gas with the waste gas to partly fused and unfused ore to partly reduce and to fuse the same.

8. A method of obtaining metal from its oxide ore, comprising passing a reducing gas through molten ore in one part of a furnace, said molten ore having been previously partly reduced in another part of the furnace, burning part of the excess reducing gas in the waste gas, passing the remaining excess gas over molten ore in said another part of the furnace to partly reduce said latter ore preparatory to the passing of reducing gas therethrough in the first mentioned part of the furnace, and transferring the partly reduced molten ore from the second to the first mentioned parts of the furnace.

9. A method of obtaining metal from its oxide ore, comprising passing a reducing gas through molten ore in one part of a furnace, said molten ore having been previously partly reduced in another part of the furnace, burning part of the excess reducing gas in the waste gas, passing the remaining excess gas over molten ore in said another part of the furnace to partly reduce said latter ore preparatory to the passing of reducing gas therethrough in the first mentioned part of the furnace, transferring the partly reduced molten ore from the second to the first mentioned parts of the furnace, burning part of the excess reducing gas in the waste gas over the molten ore in said second mentioned part of the furnace, and passing the remaining excess reducing gas with the waste gas to incompletely fused ore in a third part of the furnace for partly fusing and partly reducing the ore in said third part of the furnace preparatory to supplying the latter ore to said second mentioned part of the furnace.

10. A method of obtaining metal from its oxide ore, comprising passing a reducing gas through molten ore in one part of a furnace, said molten ore having been previously partly reduced in another part of the furnace, burning part of the excess reducing gas in the waste gas, passing the remaining excess gas over molten ore in said another part of the furnace to partly reduce said latter ore preparatory to the passing of reducing gas therethrough in the first mentioned part of the furnace, transferring the partly reduced molten ore from the second to the first mentioned parts of the furnace, burning part of the excess reducing gas in the waste gas over the molten ore in said second mentioned part of the furnace, passing the remaining excess reducing gas with the waste gas to incompletely fused ore in a third part of the furnace for partly fusing and partly reducing the ore in said third part of the furnace preparatory to supplying the latter ore to said second mentioned part of the furnace, burning the remaining excess reducing gas in said third part of the furnace, and passing the products of combustion over ore in a fourth part of the furnace for pre-heating the ore preparatory to transferring the latter ore to said third part of the furnace.

11. A continuous process of treating metal ores in successive stages of a furnace, comprising reducing molten ore in the reducing stage, using the waste heat of the reducing stage to partly reduce and maintain in molten condition fused ore in the pre-reducing stage, using waste heat of the latter stage to partly reduce and fuse ore in the fusing stage, and using waste heat of the latter stage to pre-heat ore in the pre-heating stage.

12. A continuous process of treating metal ores in successive stages of a furnace, comprising reducing molten ore in the reducing stage, using the waste heat of the reducing stage to partly reduce and maintain in molten condition fused ore in the pre-reducing stage.

13. A method of obtaining metal from its oxide ore, comprising passing a reducing gas through molten ore in excess of the amount required for the reduction of the ore, mixing a supporter of combustion with said excess reducing gas for maintaining in molten state successive ore preparatory to the reduction thereof, the remaining excess reducing gas acting upon said successive ore to partly reduce the same.

14. A method of obtaining metal from its oxide ore, comprising passing a reducing gas through molten ore in excess of the amount required for the reduction of the ore, mixing a supporter of combustion with said excess gas for maintaining in molten state the liquid mass of metal oxide and slag in the final stage of reduction, the remaining excess reducing gas partly reducing successive ore preparatory to the reduction thereof.

15. The method of obtaining metal from its oxide ore, comprising the treating of a series of ore batches simultaneously wherein one batch is preheated preparatory for transfer to the place of the batch being melted, a second batch is melted preparatory for transfer to the place of the batch being pre-reduced, a third batch in molten state is pre-reduced preparatory for transfer to the place of the batch being reduced, and a fourth batch is reduced to obtain a pure metal.

16. In a method of obtaining iron from its oxide ore, the step of melting the ore by heat of waste gas and maintaining the temperature of the ore at a point above the melting point of the ore and below that of the iron metal.

17. A method of obtaining iron from its oxide ore, comprising melting the ore by heat or waste gas, maintaining the temperature of the ore at a point above the melting point of the ore and below that of the iron metal, passing a reducing gas through the molten ore to reduce the same, burning the excess gas in the waste gas to increase the temperature of the mass above the melting point of the iron metal.

18. A method of obtaining iron from its oxide ore, comprising preliminary melting and partly reducing a batch of ore by the heat of waste gas and excess reducing gas from another batch being reduced, passing reducing gas through said another batch, drawing out the slag from the latter batch, and burning reducing gas and supporter of combustion over the remainder of said another batch to melt the semi-fused iron that has been reduced.

19. A reducing furnace comprising a pre-heater for metal ore, a hearth for molten ore, means for conveying the pre-heated ore to the hearth, means for partly reducing and partly fusing the ore being conveyed to the hearth, and means for reducing the molten ore to produce pure metal.

20. A furnace for reducing metal from its oxide ore, comprising a hearth for holding a molten batch of ore, tuyères for introducing a reducing gas into said batch, the outlets of said tuyères being located at points above the final level of the fused metal obtained after reduction.

21. A furnace for reducing metal from its oxide ore, comprising a hearth for holding a molted batch or ore, tuyères for introducing a reduing gas into said batch, the outlets of said tuyères being located at points above the final level of the semi-fused metal obtained after reduction, other tuyères for introducing an oxidizing gas at the same level as the outlets of the reducing gas tuyères for burning of gaseous proximately over the surface of the semi-fused metal for melting the same.

22. A furnace for reducing metal from its oxide ore, comprising a hearth for holding a molten batch of ore, tuyères for introducing a reducing gas into said batch, the outlets of said tuyères being located at points above the final level of the semi-fused metal obtained after reduction, other tuyères above said first tuyères for supplying a gas for burning the excess reducing gas rising from the lower tuyères for heating the charge in the hearth.

23. A furnace for reducing metal from its oxide ore, comprising hearths proximately located and adapted to hold molten ore, means for conveying molten ore from one to the other of said hearths, a passage from over one to the other of said hearths, means for passing a reducing gas through the molten ore on one of said hearths, means for causing a burning of excess reducing gas in waste gas and the passing of said burning gases through said passage and over the other of said hearth to partly reduce and maintain molten the ore in the other of said hearths.

24. A furnace for reducing metal from its oxide ore, comprising hearths proximately located and adapted to hold molten ore, means for conveying molten ore from one to the other of said hearths, a pre-heating device for the ore, a passage from the pre-heating device to one of said hearths for the passage therethrough of the pre-heated ore, and means for partly reducing and for melting the ore passing through said passage.

25. A furnace for reducing metal from its oxide ore, comprising hearths proximately located and adapted to hold molten ore, means for conveying molten ore from one to the other of said hearths, a pre-heating device for the ore, a passage from the pre-heating device to one of said hearths, for the passage therethrough of the pre-heated ore, said passage having an inclined portion for the sliding thereover of the pre-heated ore, and means for fusing and partly reducing the ore passing over said inclined portion.

26. A furnace for obtaining metal from its oxide ore, comprising a shallow hearth for holding molten ore, a reducing hearth near said shallow hearth, and an inclined duct for conducting molten ore from the shallow hearth to the reducing hearth.

27. A furnace for obtaining metal from its oxide ore, comprising a shallow hearth for holding molten ore, a reducing hearth near said shallow hearth, an inclined duct for conducting molten ore from the shallow hearth to the reducing hearth, means for passing reducing gas through the molten ore on the reducing hearth, and means for passing excess reducing gas and waste gas over the molten ore on the shallow hearth for partly reducing said ore and to maintain said ore in molten state.

In witness whereof, I hereunto subscribe my name to this specification.

SAMUEL L. MADORSKY.